(12) United States Patent
Zhang et al.

(10) Patent No.: US 9,065,788 B2
(45) Date of Patent: Jun. 23, 2015

(54) METHOD, DEVICE AND SYSTEM FOR VOICE COMMUNICATION

(71) Applicant: Tencent Technology (Shenzhen) Company Limited, Shenzhen (CN)

(72) Inventors: Bin Zhang, Shenzhen (CN); Yuejun Liu, Shenzhen (CN); Kai Liu, Shenzhen (CN); Jinhai Liu, Shenzhen (CN); Liangliang Fan, Shenzhen (CN); Chenglin Liu, Shenzhen (CN); Yueteng Weng, Shenzhen (CN); Yaxuan Zhu, Shenzhen (CN); Qing He, Shenzhen (CN); Yuexin Zhang, Shenzhen (CN); Jin Lin, Shenzhen (CN); Yuewei Chen, Shenzhen (CN); Qianya Lin, Shenzhen (CN); Kai Li, Shenzhen (CN); Yi Dan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/160,454

(22) Filed: Jan. 21, 2014

(65) Prior Publication Data

US 2014/0323166 A1 Oct. 30, 2014

Related U.S. Application Data

(63) Continuation of application No. PCT/CN2013/087414, filed on Nov. 19, 2013.

(30) Foreign Application Priority Data

Apr. 28, 2013 (CN) .......................... 2013 1 0155849

(51) Int. Cl.
*H04L 12/58* (2006.01)
*H04W 4/12* (2009.01)

(52) U.S. Cl.
CPC ........ *H04L 51/04* (2013.01); *H04W 4/12* (2013.01)

(58) Field of Classification Search
CPC .................................. H04W 4/12; H04L 51/04
USPC ................ 455/466, 456.1, 456.3; 379/88.01, 379/32.01; 709/205
See application file for complete search history.

(56) References Cited

U.S. PATENT DOCUMENTS 8,959,156 B2 * 2/2015 Polis et al. ..................... 709/205
2008/0037720 A1 * 2/2008 Thomson et al. .......... 379/88.01

* cited by examiner

*Primary Examiner* — Phuoc H Doan
(74) *Attorney, Agent, or Firm* — Morgan, Lewis & Bockius LLP (57) ABSTRACT

A method is performed at a computer server for enabling voice communication between two terminals through IM service. Upon receiving a message from a remote computer, the message including an IM identifier of a callee terminal user and a mobile device identifier of the terminal, the computer system updates an entry for the callee terminal user in a database. Upon receiving a request from a caller terminal user at a caller terminal to start voice communication with the callee terminal user, the computer server identifies the entry that includes the IM identifier of the callee terminal user and sends a voice communication request to a service control point (SCP) in a switched telephone network. The SCP then returns an IP address and a port number of the callee terminal and launches a call request against the callee terminal. The computer server establishes a voice communication channel between the two terminals.

20 Claims, 7 Drawing Sheets

METHOD, DEVICE AND SYSTEM FOR VOICE COMMUNICATION

RELATED APPLICATIONS

This application is a continuation application of PCT Patent Application No. PCT/CN2013/087414, entitled "METHOD, DEVICE AND SYSTEM FOR VOICE COMMUNICATION" filed Nov. 19, 2013, which claims priority to Chinese Patent Application No. 201310155849.1, "METHOD, DEVICE AND SYSTEM FOR VOICE COMMUNICATION," filed Apr. 28, 2013, both of which are hereby incorporated by reference in their entirety.

FIELD OF THE INVENTION

The present application relates to the field of communication, especially relates to a method, device and system for voice communication.

BACKGROUND OF THE INVENTION

Instant Messenger (hereinafter referred to as IM) is Internet-based communication service. IM enables the communication and interaction of texts, voice, videos, files and other information between the communicating parties. In general, after a user logs into the IM server with the user's account information through a caller terminal (e.g., a smartphone or tablet computer), the caller terminal user can make voice communication with the user of a callee terminal (e.g., another smartphone or tablet computer) that has already logged into the IM server to effectively save the economic costs of the two communicating parties.

However, in practice, both the caller and the callee terminals are requested to log into the IM server by the above-mentioned voice communication method. In terms of the callee terminals such as an old version of mobile phone without the capability to log into the IM server (e.g., a feature phone), the caller terminal cannot start voice communication via the IM server with the callee terminals even if the caller terminal logs into the IM server.

SUMMARY

The above deficiencies and other problems associated with the conventional approach of enabling voice communication between two terminals through an instant messaging service are reduced or eliminated by the present application disclosed below. In some embodiments, the present application is implemented in a computer system that has one or more processors, memory and one or more modules, programs or sets of instructions stored in the memory for performing multiple functions. Instructions for performing these functions may be included in a computer program product configured for execution by one or more processors.

One aspect of the present application involves a computer-implemented method performed by a computer system having one or more processors and memory for enabling voice communication between two terminals through instant messaging (IM) service. The computer-implemented method includes: receiving a message from a remote computer, the message including an IM identifier of a callee terminal user of the IM service and a mobile device identifier of the callee terminal; updating an entry for the callee terminal user of the IM service in a database at the computer server, the entry including the IM identifier of the callee terminal user and the mobile device identifier of the callee terminal; receiving a voice communication request from a caller terminal user of the IM service at a caller terminal to start voice communication with the callee terminal user of the IM service, the request including the IM identifier of the callee terminal user; and in response to the voice communication request: identifying the database entry that includes the IM identifier of the callee terminal user; sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and establishing a voice communication channel between the caller terminal and the callee terminal using the IP address and the port number of the callee terminal.

Another aspect of the present application involves a computer system. The computer system includes memory, one or more processors, and one or more programs stored in the memory and configured for execution by the one or more processors. The one or more programs include instructions for: receiving a message from a remote computer, the message including an IM identifier of a callee terminal user of the IM service and a mobile device identifier of the callee terminal; updating an entry for the callee terminal user of the IM service in a database at the computer server, the entry including the IM identifier of the callee terminal user and the mobile device identifier of the callee terminal; receiving a voice communication request from a caller terminal user of the IM service at a caller terminal to start voice communication with the callee terminal user of the IM service, the request including the IM identifier of the callee terminal user; and in response to the voice communication request: identifying the database entry that includes the IM identifier of the callee terminal user; sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and establishing a voice communication channel between the caller terminal and the callee terminal using the IP address and the port number of the callee terminal.

Another aspect of the present application involves a non-transitory computer readable storage medium having stored therein one or more programs for execution by one or more processors of a computer system, the one or more programs including instructions for: receiving a message from a remote computer, the message including an IM identifier of a callee terminal user of the IM service and a mobile device identifier of the callee terminal; updating an entry for the callee terminal user of the IM service in a database at the computer server, the entry including the IM identifier of the callee terminal user and the mobile device identifier of the callee terminal; receiving a voice communication request from a caller terminal user of the IM service at a caller terminal to start voice communication with the callee terminal user of the IM service, the request including the IM identifier of the callee terminal user; and in response to the voice communication request: identifying the database entry that includes the IM identifier of the callee terminal user; sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and establishing a voice communication channel between the caller terminal and the callee terminal using the IP address and the port number of the callee terminal.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings. In order to describe more clearly the technical proposal of the embodiment for the present application, it will briefly describe the figures used in the embodiment below. Obviously, the figures described below are only some embodiments of the present application. The ordinary technicians engaging in this field can acquire others based on these figures, at the premise of not making a creative effort.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following context will clearly and completely describe the technical proposal in the embodiment of the present application in combination with the figures. Obviously, the embodiments described below are only part rather than all of the present application. The ordinary technicians engaging in this field can acquire others based on these embodiments at the premise of not making a creative effort, all belonging to the protective scope of the present application.

The embodiments of the present application disclose a voice communication method, device and system, which enables the caller terminal users logging into the IM server to begin voice communication with the callee terminal users not logging into the IM server. This provides rather high practicality and great market potentiality to be described respectively in detail below.

Figure 1:
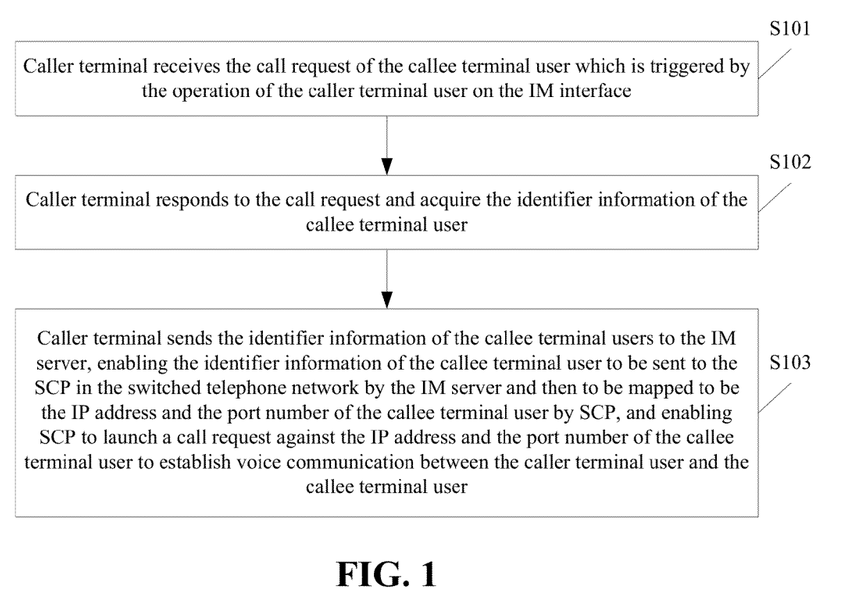
FIG. 1 is a flow diagram for a voice communication method according to some embodiments of the present application.

FIG. 1 is a flow diagram for a voice communication method according to some embodiments of the present application. The voice communication method described in FIG. 1 is described from the point of the caller terminal. In the embodiment of the present application, the caller terminal can operate mobile phone, Tablet PC in Android or iOS systems. Users of the caller terminal are capable to log into the IM server with the account information in such cases. Such a voice communication method may include following steps, as shown in FIG. 1.

S101, the caller terminal receives the call request of the callee terminal users which is triggered by the operation of the caller terminal on the IM interface.

In the embodiment of the present application, the caller terminal can receive the call request of the callee terminal users which is triggered by the operation of the caller terminal users on the call request identifier corresponding to the callee terminal users and shown on the IM interface after logging into the IM server with the account information on the caller terminal.

For example, the caller terminal users can operate the call request identifier corresponding to the callee terminal users and shown on the IM interface by a click, thus triggering the call request of the callee terminal users and further enabling the caller terminal to receive the call request of the callee terminal users.

S102, the caller terminal responds to the call request and acquires the identifier information of the callee terminal user.

In the embodiment of the present application, the identifier information of the callee terminal users can include the International Mobile Subscriber Identifier Number (IMSI) of the callee terminal, or the address of Medium/Media Access Control (MAC) of the callee terminal, etc. No limitation is made in the embodiment of the present application.

S103, the caller terminal sends the identifier information of the callee terminal users to the IM server, enabling the identifier information of the callee terminal users to be sent to the SCP in the switched telephone network by the IM server and then to be mapped to be the IP address and the port number of the callee terminal user by SCP, and enabling SCP to launch a call request against the IP address and the port number of the callee terminal user to establish voice communication between the caller terminal user and the callee terminal user.

In practical applications, when the callee terminal is accessed to the network, SCP in the switched telephone network can establish the corresponding relation among identifier information, IP address and the port number of the callee terminal user, and when the IP address and the pot number are changed due to roaming of the callee terminal, SCP in the switched telephone network will also accordingly update the IP address and the port number of the callee terminal user in such a corresponding relation. Thus, after SCP in the switched telephone network receives the identifier information of the callee terminal user sent by the IM server, SCP can map the identifier information of the callee terminal user to the IP address and port number of the callee terminal user according to such a corresponding relation, and SCP further can launch a call request against the IP address and port number of the callee terminal user to establish voice communication between the caller terminal user and the callee terminal user.

In the embodiment of the present application, the call request launched against the IP address and port number of the callee terminal user by SCP can be the call request of H.323 protocol audio service. No limitation is made in the embodiment of the present application.

Following steps can be taken before Step S101 is executed by the voice communication method described in FIG. 1 in the embodiment of the present application:

11) The caller terminal responds to the scan instruction triggered by the caller terminal user, scans the two-dimensional code and acquires the identifier information of the callee terminal user.

In the embodiment of the present application, the caller terminal user can initiate the scan plug-in provided by the IM server after logging into the IM server with the account information on the caller terminal. This triggers the scan instruction to the caller terminal, enables the caller terminal to respond to the scan instruction triggered by the caller terminal user and scans the two-dimensional code of the callee terminal user, thus acquiring the identifier information of the callee terminal user.

12) The caller terminal stores the identifier information of the callee terminal user acquired.

13) The caller terminal generates the call request identifier corresponding to the callee terminal user and shows the call request identifier corresponding to the callee terminal user via the IM interface.

Accordingly, the caller terminal can receive the call request of the callee terminal users which is triggered by the operation of the caller terminal users on the call request identifier corresponding to the callee terminal users and shown on the IM interface.

In the voice communication method described in FIG. 1 included in the embodiment of the present application, SCP can enquire the on-line state of the callee terminal user before it launches a call request against the IP address and port number of the callee terminal user, if the callee terminal user is under a state of online to be connected, SCP may execute the step to launch a call request against the IP address and port number of the callee terminal user; otherwise, if the callee terminal user is not under a state of online to be connected (for example, the callee terminal user is busy of powered off), the off-line information of the callee terminal user can be sent to the IM server by SCP and then to the caller terminal by the IM server; accordingly, the caller terminal can also receive the off-line information of the callee terminal user sent by the IM server.

In the voice communication method described in FIG. 1, the identifier information of the callee terminal user can be acquired and sent to the IM server by the caller terminal and then to the Service Control Point (SCP) in the switched telephone network by the IM server after the caller terminal receives the call request of the callee terminal user which is triggered by the operation of the caller terminal user on the IM interface. This enables SCP to launch a call request against the IP address and port number of the callee terminal user after mapping the identifier information of the callee terminal user to the IP address and port number of the callee terminal user, thus establishing voice communication between the caller terminal user and the callee terminal user. The implementation of the voice communication method described in FIG. 1 enables the voice communication between the caller terminal user logging into the IM server and the callee terminal users not logging into the IM server. This provides not only rather high practicality but also great market potentiality.

Figure 2:
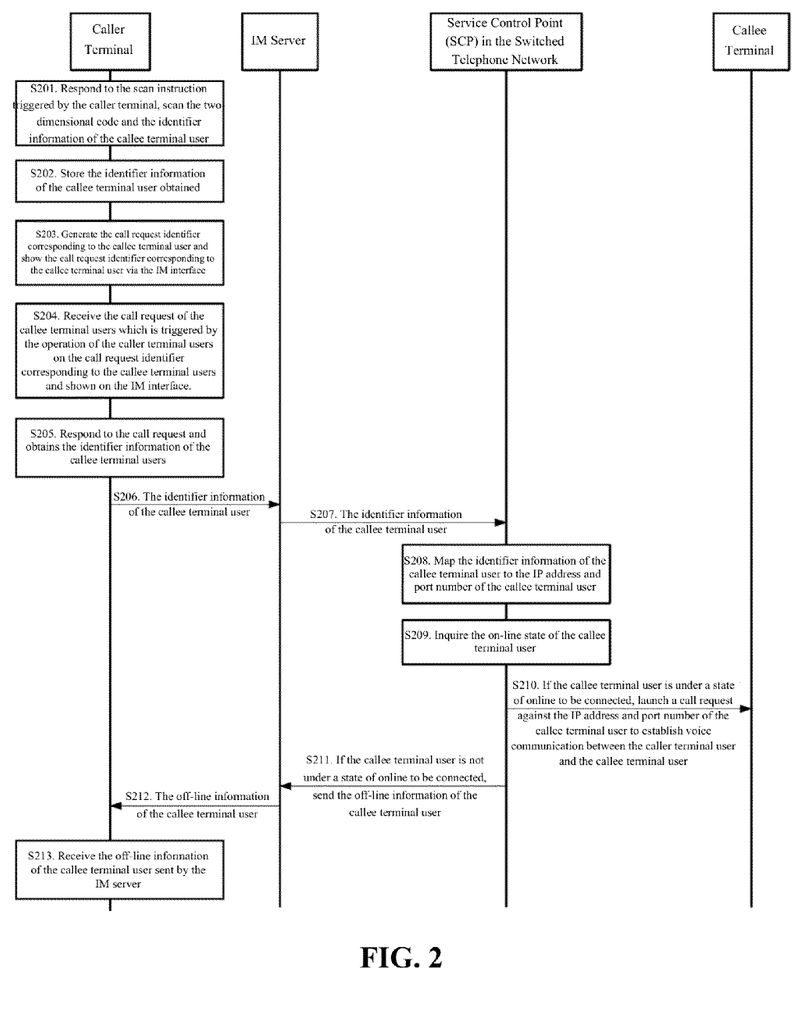
FIG. 2 is a flow diagram for another voice communication method according to some embodiments of the present application.

FIG. 2 is a flow diagram for another voice communication method according to some embodiments of the present application. The voice communication method described in FIG. 2 is presented from multiple aspects. The caller terminal is assumed to be the one logging into the IM server in the voice communication method described in FIG. 2, while the callee terminal is the one without the capability to log into the IM server. Such a voice communication method may include following steps, as shown in FIG. 2.

S201, the caller terminal responds to the scan instruction triggered by the caller terminal user, scans the two-dimensional code and acquires the identifier information of the callee terminal user.

In the embodiment of the present application, the caller terminal user can initiate the scan plug-in provided by the IM server after logging into the IM server with the account information on the caller terminal. This triggers the scan instruction to the caller terminal, enables the caller terminal to respond to the scan instruction triggered by the caller terminal user and scans the two-dimensional code of the callee terminal user, thus acquiring the identifier information of the callee terminal user.

S202, the caller terminal stores the identifier information of the callee terminal user acquired.

In the embodiment of the present application, the identifier information of the callee terminal users can include IMSI or MAC address of the callee terminal. No limitation is made in the embodiment of the present application.

S203, the caller terminal generates the call request identifier corresponding to the callee terminal user and shows the call request identifier corresponding to the callee terminal user via the IM interface.

The sequence of the Steps S202-203 are interchangeable. No limitation is made in the embodiment of the present application.

S204, the caller terminal can receive the call request of the callee terminal users which is triggered by the operation of the caller terminal users on the call request identifier corresponding to the callee terminal users and shown on the IM interface.

S205, the caller terminal responds to the call request and acquires the identifier information of the callee terminal users.

S206, the caller terminal sends the identifier information of the callee terminal user to the IM server.

S207, the IM server sends the identifier information of the callee terminal user to the Service Control Point (SCP) in the switched telephone network.

S208, the Service Control Point (SCP) in the switched telephone network maps the identifier information of the callee terminal user to the IP address and port number of the callee terminal user.

In the embodiment of the present application, SCP in the switched telephone network can establish the corresponding relation among identifier information, IP address and the port number of the callee terminal user. After SCP in the switched telephone network receives the identifier information of the callee terminal user sent by the IM server, SCP can map the identifier information of the callee terminal user to the IP address and port number of the callee terminal user according to such a corresponding relation.

S209, the Service Control Point (SCP) in the switched telephone network inquires the on-line state of the callee terminal user. If the callee terminal user is under a state of online to be connected, the Service Control Point (SCP) in the switched telephone network may execute Step S210; if the callee terminal user is not under a state of online to be connected (for example, the callee terminal user is busy or powered off), the Service Control Point (SCP) in the switched telephone network may execute Steps S211-213.

S210, if the callee terminal user is under a state of online to be connected, the Service Control Point (SCP) in the switched telephone network may launch a call request against the IP address and port number of the callee terminal user to establish voice communication between the caller terminal user and the callee terminal user.

S211, if the callee terminal user is not under a state of online to be connected, the Service Control Point (SCP) in the switched telephone network will send the off-line information of the callee terminal user to the IM server.

S212, the IM server receives the off-line information of the callee terminal user sent by SCP in the switched telephone network and sends it to the caller terminal.

S213, the caller terminal receives the off-line information of the callee terminal user sent by the IM server.

In the voice communication method described in FIG. 2, the identifier information of the callee terminal user can be acquired and sent to the IM server by the caller terminal and then to the Service Control Point (SCP) in the switched telephone network by the IM server after the caller terminal receives the call request of the callee terminal user which is triggered by the operation of the caller terminal user on the IM interface. This enables SCP to first enquire the on-line state of the callee terminal user after mapping the identifier information of the callee terminal user to the IP address and port number of the callee terminal user. If the callee terminal user is under a state of online to be connected, SCP will launches a call request against the IP address and port number of the callee terminal user to establish voice communication between the caller terminal user and the callee terminal user. The implementation of the voice communication method described in FIG. 2 enables the voice communication between the caller terminal user logging into the IM server and the callee terminal users not logging into the IM server. This provides not only rather high practicality but also great market potentiality.

Figure 3:
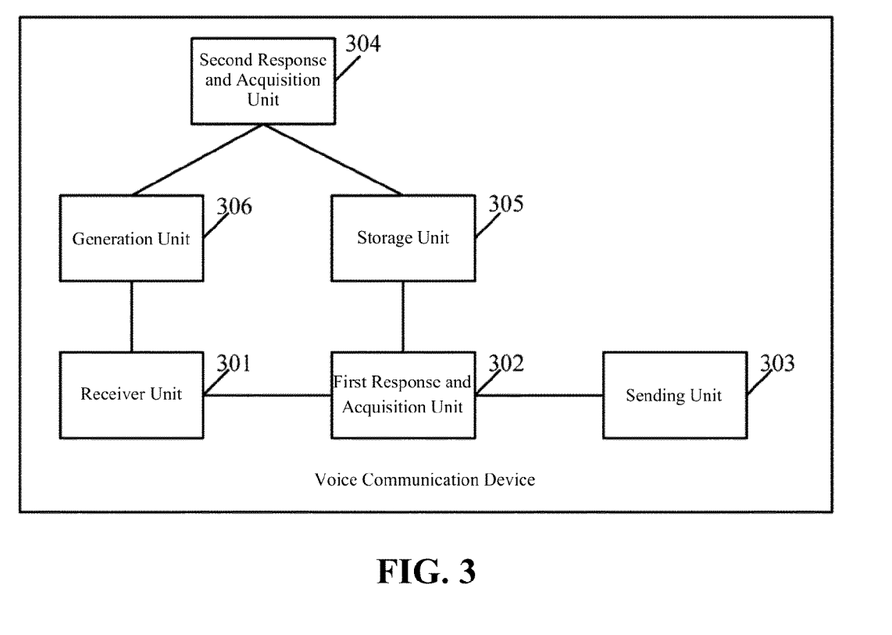
FIG. 3 is a block diagram of a mobile device for conducting voice communication with another mobile device according to some embodiments of the present application.

FIG. 3 is a block diagram of a mobile device for conducting voice communication with another mobile device according to some embodiments of the present application. The voice communication device described in FIG. 3 can either be an independent device or the part additionally attached to a mobile phone to execute the voice communication method according to some embodiments of the present application. As shown in FIG. 3, such a voice communication device includes:

The Receiver Unit 301 is to receive the call request of the callee terminal user which is triggered by the operation of the caller terminal user on the IM interface.

The First Response and Acquisition Unit 302 is to respond to the call request and acquires the identifier information of the callee terminal user.

In the embodiment of the present application, the identifier information of the callee terminal user can include IMSI or MAC address of the callee terminal. No limitation is made in the embodiment of the present application.

The Sending Unit 303 is to send the identifier information of the callee terminal users to the IM server, enabling ID information of the callee terminal users to be sent to SCP in the switched telephone network by the IM server and then to be mapped to be the IP address and the port number of the callee terminal user by SCP, and enabling SCP to launch a call request against the IP address and the port number of the callee terminal user to establish voice communication between the caller terminal user and the callee terminal user.

In the embodiment of the present application, the voice communication device shown in FIG. 3 also includes:

The Second Response and Acquisition Unit 304 is to respond to the scan instruction triggered by the caller terminal user, scan the two-dimensional code and acquire the identifier information of the callee terminal user before the Receiver Unit 301 receives the call request of the callee terminal user which is triggered by the operation of the caller terminal user on the IM interface.

The Storage Unit 305 is to store the identifier information of the callee terminal user acquired by the Second Response and Acquisition Unit 304.

The Generation Unit 306 is to generate the call request identifier distributed corresponding to the callee terminal user and show the call request identifier corresponding to the callee terminal user via the IM interface.

Accordingly, the First Response and Acquisition 302 is to respond to the call request of the callee terminal user and to acquire the identifier information of the callee terminal user from the Storage Unit 305.

Accordingly, the Receiver Unit 301 is to receive the call request of the callee terminal users which is triggered by the operation of the caller terminal users on the call request identifier corresponding to the callee terminal users, shown on the IM interface and generated by the Generation Unit 306.

In the embodiment of the present application, SCP can enquire the on-line state of the callee terminal user before it launches a call request against the IP address and port number of the callee terminal user. If the callee terminal user is under a state of online to be connected, SCP may execute the step to launch a call request against the IP address and port number of the callee terminal user; if the callee terminal user is not under a state of online to be connected, SCP may send the off-line information of the callee terminal user to the IM server; accordingly, the Receiver Unit 301 can also receive the off-line information of the callee terminal user sent by the IM server.

Among which, the implementation of the voice communication device described in FIG. 3 enables the voice communication between the caller terminal user logging into the IM server and the callee terminal users not logging into the IM server. This provides not only rather high practicality but also great market potentiality.

Figure 4:
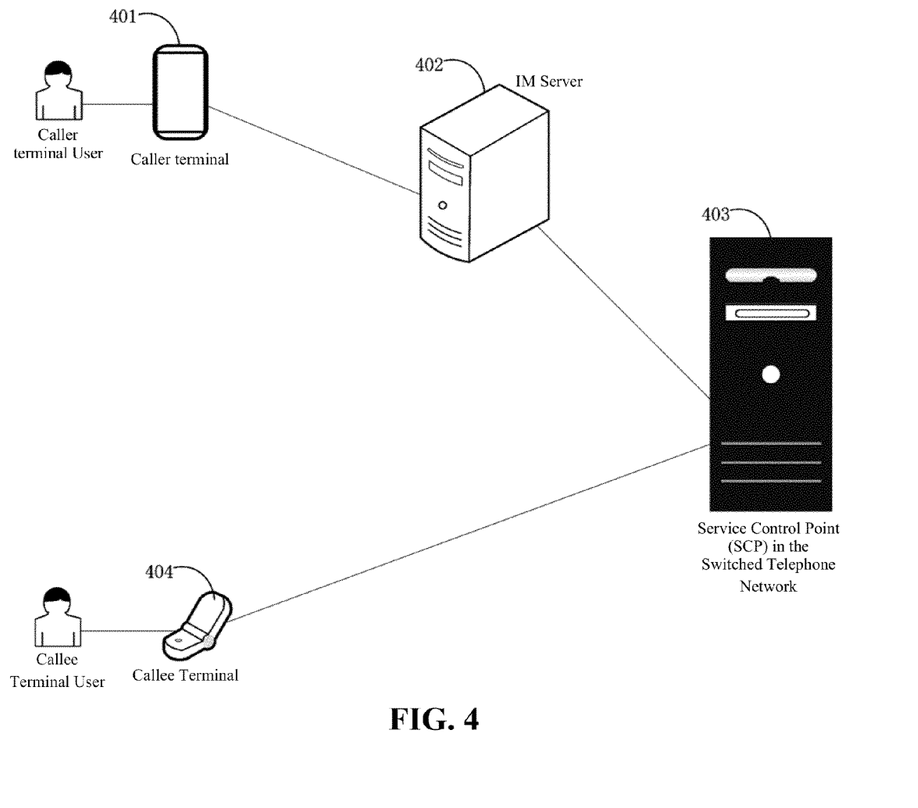
FIG. 4 is a block diagram of a computer system for enabling a voice communication between two terminals according to some embodiments of the present application.

FIG. 4 is a block diagram of a computer system for enabling a voice communication between two terminals according to some embodiments of the present application. As shown in FIG. 4, such a voice communication system includes the Caller Terminal 401, IM Server 402, and SCP 403 in the Switched Telephone network as well as the Called Terminal 404, among which:

The Caller Terminal 401 is to receive the call request of the callee terminal user which is triggered by the operation of the caller terminal user on the call request interface, respond to the call request of the callee terminal user, acquire the identifier information of the callee terminal user and send it to IM Server 402.

IM Server 402 is to send the identifier information of the callee terminal user to SCP 403 in the Switch Telephone Network.

SCP 403 in the Switch Telephone Network is to map the identifier information of the callee terminal user to the IP address and port number of the callee terminal user and to launch a call request against the IP address and port number of the callee terminal user.

Called Terminal 404 is to receive the call request sent by SCP 403 in the Switch Telephone Network for establish of the voice communication between the caller terminal user and the callee terminal user.

In the embodiment of the present application, before Caller Terminal 401 receives the call request of the callee terminal user which is triggered by the operation of the caller terminal users on the IM interface, the Caller Terminal 401 is used to respond to the scan instruction triggered by the caller terminal user, scan the two-dimensional code of the callee terminal user, acquire and store the identifier information of the callee terminal user, generate the call request identifier corresponding to the callee terminal user and show the call request identifier corresponding to the callee terminal user via the IM interface.

In the embodiment of the present application, the identifier information of the callee terminal users can include IMSI or MAC address of the callee terminal. No limitation is made in the embodiment of the present application.

In the embodiment of the present application, specific modes for Caller Terminal 401 to receive the call request of the callee terminal user which is triggered by the operation of the caller terminal user on the IM interface include:

Caller Terminal 401 is to receive the call request of the callee terminal user which is triggered by the operation of the caller terminal user on call request identifier corresponding to the callee terminal user and shown on the IM interface.

In the embodiment of the present application, SCP 403 in the Switched Telephone Network can enquire the on-line state of the callee terminal user before it launches a call request against the IP address and port number of the callee terminal user. If the callee terminal user is under a state of online to be connected, SCP 403 in the Switched Telephone Network may execute the step to launch a call request against the IP address and port number of the callee terminal user.

In the embodiment of the present application, if the callee terminal user is not under a state of online to be connected, SCP 403 in the Switched Telephone Network may send the off-line information of the callee terminal user to the IM server; Caller Terminal 401 can also receive the off-line information of the callee terminal user sent by the IM server.

Among which, the implementation of the voice communication system described in FIG. 4 enables the voice communication between the caller terminal user logging into the IM server and the callee terminal users not logging into the IM server. This provides not only rather high practicality but also great market potentiality.

Figure 5:
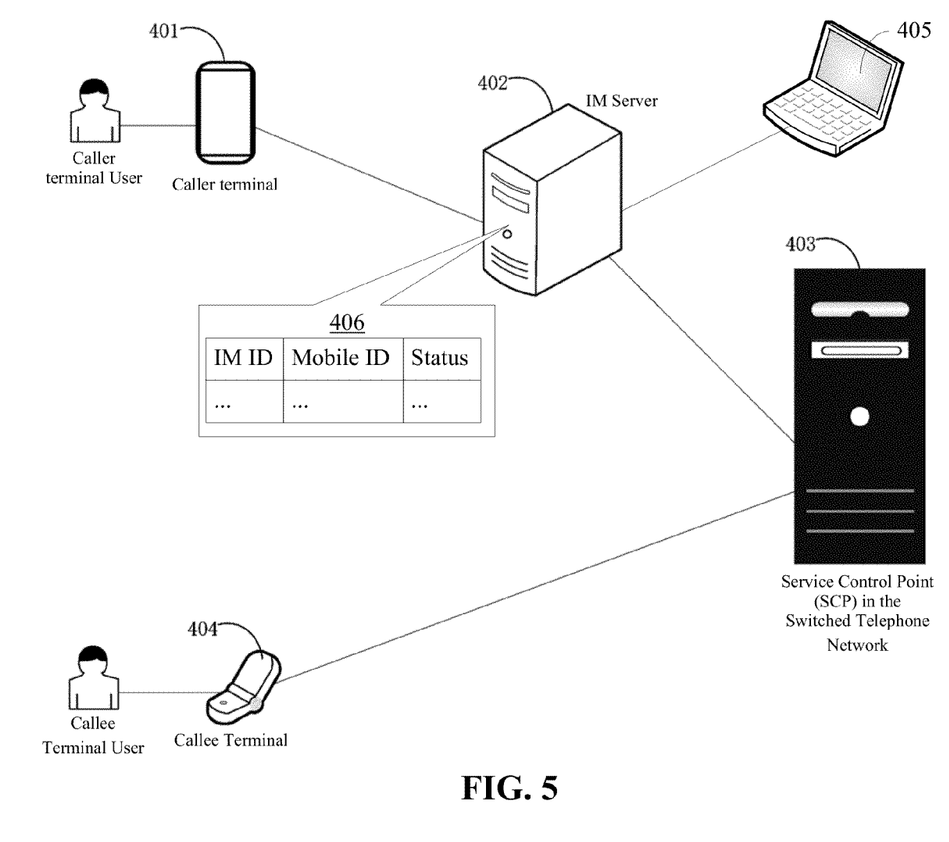
FIG. 5 is a block diagram of another computer system for enabling a voice communication between two terminals according to some embodiments of the present application.

FIG. 5 is a block diagram of another computer system for enabling a voice communication between two terminals according to some embodiments of the present application. Like what is shown in FIG. 4, the computer system includes a caller terminal 401 from which the caller terminal user can launch a request to start a voice communication with a callee terminal user at the callee terminal 404. The computer system includes an IM server 402 that provides IM service to multiple users. For example, the caller terminal user can send an instant text message to the callee terminal user through the IM server 402. In some embodiments, a user of the IM server 402 may be able to access the IM server 402 from multiple terminals with different capabilities. For example, the user may access the IM server 402 from a laptop or desktop computer 405 or a mobile device such as a smart phone or tablet computer by providing the user's login information (including user name and password) through a browser application or a dedicated client-side application. As described above, some legacy terminals (e.g., a feature phone like the callee terminal 404) may not be capable of having either a browser application or a client-side application for exchanging data with the IM server 402 directly. In this case, the callee terminal user of the callee terminal 404 may need to communicate with the IM server 402 through an additional device such as the SCP 403 if it plans to maintain a voice communication channel with the caller terminal 401 through the IM server 402.

As shown in FIG. 5, the IM server 402 has a database 406 for storing the status information of different users of the IM server 402. For example, the callee terminal user may first log into the user's account at the IM server 402 through the computer terminal 405. After logging in, the user can specify whether there is any callee terminal (legacy or not) that the user owns and would like to be associated with the user's account at the IM server 402. For each callee terminal to be registered at the IM server 402, the user may provide its mobile ID (e.g., IMSI or MAC number) and a current status of the callee terminal (active or inactive). In some embodiments, one IM ID is at most associated with one active callee terminal at any moment. This requirement is to make sure that only one callee terminal is invoked when a caller terminal user launches a request to start a voice communication channel with the callee terminal user. As noted above, the IM server 402 first checks the database 406 to identify an active callee terminal. If the identified callee terminal is a smartphone like the caller terminal 401 or the laptop computer 405 that has the capability of establishing a voice communication channel with the IM server 402, the IM server 402 sends an invitation to the identified callee terminal directly. But if the identified callee terminal happens to be a legacy feature phone like the callee terminal 404, the IM server 402 cannot send an invitation to the callee terminal 404 directly because the callee terminal 404 does not have the capability of communicating with the IM server 402 directly to establish a voice communication channel. Instead, the IM server 402 needs to forward such invitation including the callee terminal 404's mobile ID to the SCP 403. The SCP 403 maintains a mapping relationship between the mobile ID of the callee terminal 404 and the IP address and port number of the callee terminal 404 so that the SCP 403 can uniquely identify the current location of the callee terminal 404 within the switched telephone network and send an invitation to the callee terminal 404 to start a voice communication channel with the caller terminal 401.

Figure 6:
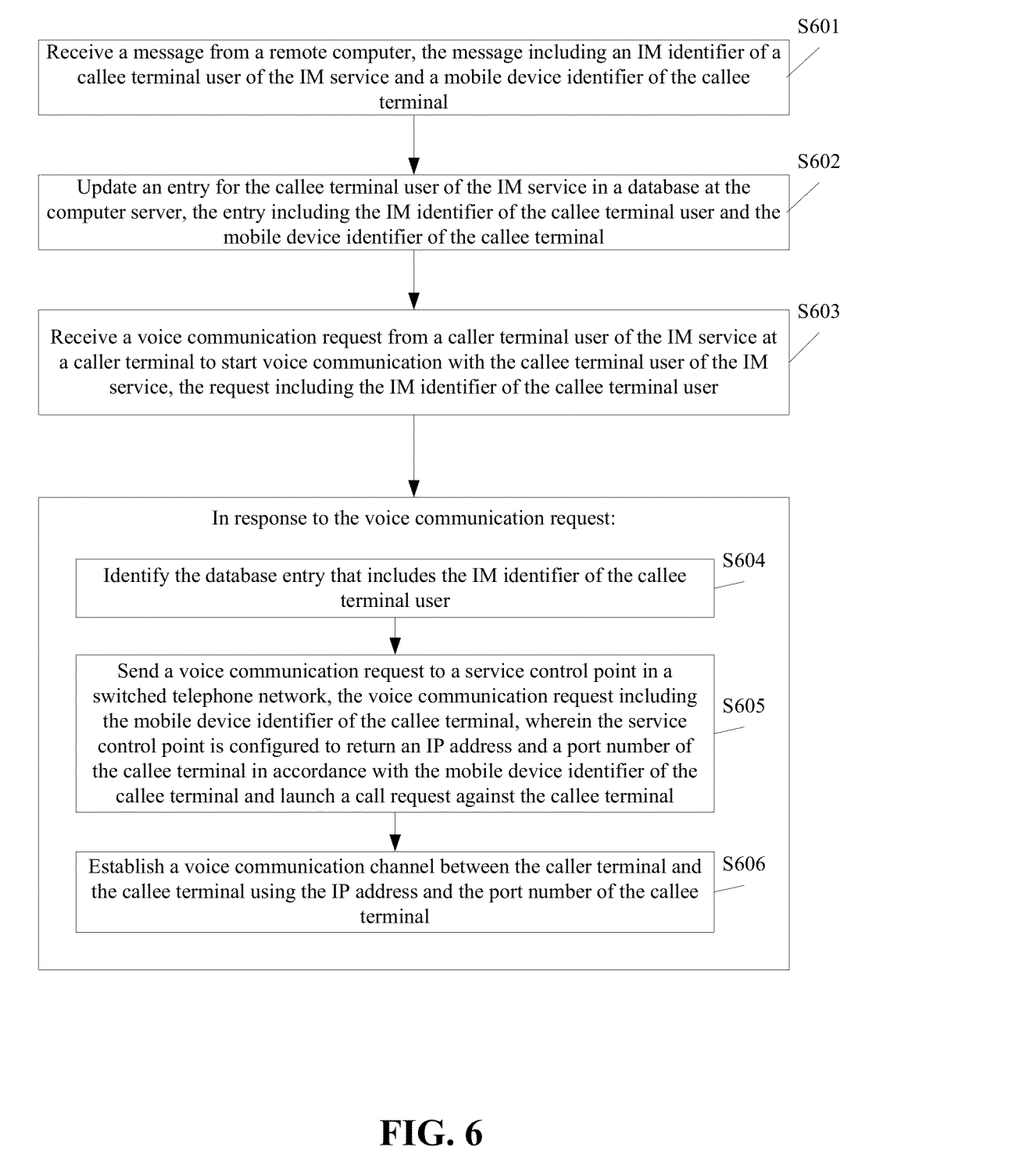
FIG. 6 is a flow diagram for yet another voice communication method according to some embodiments of the present application.

FIG. 6 is a flow diagram for yet another voice communication method according to some embodiments of the present application. This method may be performed by a computer server that provides IM service. At step S601, the computer server receives a message from a remote computer (e.g., the laptop 405 in FIG. 5). In some embodiments, the remote computer submits this message in response to a request from a user to register one of his or her terminal at the IM service so that the user can receive and accept call invitations from the registered terminal (e.g., a legacy feature phone like the callee terminal 404). The message includes an IM identifier of a callee terminal user of the IM service and a mobile device identifier of the callee terminal. In response to the message, the computer server updates an entry for the callee terminal user of the IM service in a database at the computer server at step S602. As noted above, the database may include multiple entries associated with the callee terminal user of the IM service but there is no more than one callee terminal that is configured to establish a voice communication channel with the caller terminal at a given time. In other words, there is at most one active callee terminal for communicating with the IM server 402 directly or indirectly (e.g., through the SCP 403).

At step S603, the computer server receives a voice communication request from a caller terminal user of the IM service at a caller terminal to start voice communication with the callee terminal user of the IM service. The request includes the IM identifier of the callee terminal user. Although the IM server 402 supports communications between two users in different modalities, including text, audio, video, etc., a particular user (e.g., the callee terminal user of the callee terminal) does not always have a terminal that is capable of communicating with the IM server directly.

In response to the voice communication request, the computer server identifies the database entry that includes the IM identifier of the callee terminal user (S604). If there are multiple entries, the computer server looks for the entry whose associated callee terminal is active. This scenario may happen when the callee terminal user logs into his or her account at home through a computer and updates the corresponding entry indicating that the callee terminal user is going to be with the callee terminal 404 for the next couple of hours such that all voice communication request should be directed to the callee terminal 404.

At step S605, the computer server sends a voice communication request to a service control point in a switched telephone network. In some embodiments, the voice communication request includes the mobile device identifier of the callee terminal 404. Based on the mobile ID, the service control point looks up its own database for an IP address and a port number of the callee terminal. In other words, the callee terminal 404 should have the capability of at least receiving data from the IM server 402 and process the received data. In some embodiments, the SCP returns the IP address and port number of the callee terminal 404 in accordance with the mobile device identifier of the callee terminal 404 and launches a call request against the callee terminal 404. In other words, the IP address and port number suggests that how the IM server 402 should direct future data from the caller terminal 401 to the callee terminal 404. In addition, the SCP launches a call request to the callee terminal 404 and causes the callee terminal 404 to generate a ringtone, indicating that there is a call coming in from a caller terminal. Finally, the computer server establishes a voice communication channel between the caller terminal and the callee terminal using the IP address and the port number of the callee terminal (S606). In this example, the relationship between the caller terminal 401 and the callee terminal 404 is asymmetric. In other words, the caller terminal user of the caller terminal can launch a call request to the callee terminal through the IM server 402 and the SCP 403. But the callee terminal user of the callee terminal 404 cannot launch a call request to the caller terminal through the IM server 402 and the SCP 403 because the callee terminal does not have an application for rendering such service.

In some embodiments, a callee terminal user may have multiple callee terminals. The IM server 402 needs to choose one of them for establishing the communication channel with the caller terminal 401. Therefore, upon receiving the request from the caller terminal user, the IM server 402 identifies the multiple entries associated with the callee terminal user of the IM service and their associated status information in the database 406 and then determines whether there is a callee terminal that is ready to establish a voice communication channel with the caller terminal based on the status information and, if so, which callee terminal is currently active. Finally, if no callee terminal is in an active status, the IM server 402 returns a response to the caller terminal user of the IM service indicating that it fails to establish a voice communication channel with the callee terminal user at this moment.

After the establishment of the voice communication channel, the caller terminal user at the caller terminal 401 can exchange voice data with the callee terminal user at the callee terminal 404 through the IM server 402 and the SCP 403. In some embodiments, the caller terminal user may like to share additional data with the callee terminal user during the current conversation session. For example, the caller terminal user may send text, image, video or audio data to the callee terminal user. Generally, the callee terminal 404 has limited capability to handle multimedia data. Upon receiving the multimedia data from the caller terminal, the IM server 402 determines whether the callee terminal has the capability of processing the multimedia data. If not, the IM server 402 stores the multimedia data in a database entry corresponding to the callee terminal and sends a message to the callee terminal, indicating that there is multimedia data from the caller terminal, which cannot be rendered on the callee terminal. In some embodiments, the message includes a text-based hyperlink to the stored multimedia data. The callee terminal user can then access the multimedia data through the hyperlink by, e.g., forwarding the hyperlink to another terminal (e.g., the laptop computer 405). In the callee terminal has the capability, the IM server then forwards the multimedia data to the callee terminal so that the callee terminal may be able to render the multimedia data while the callee terminal user is still in a voice communication with the caller terminal user.

Figure 7:
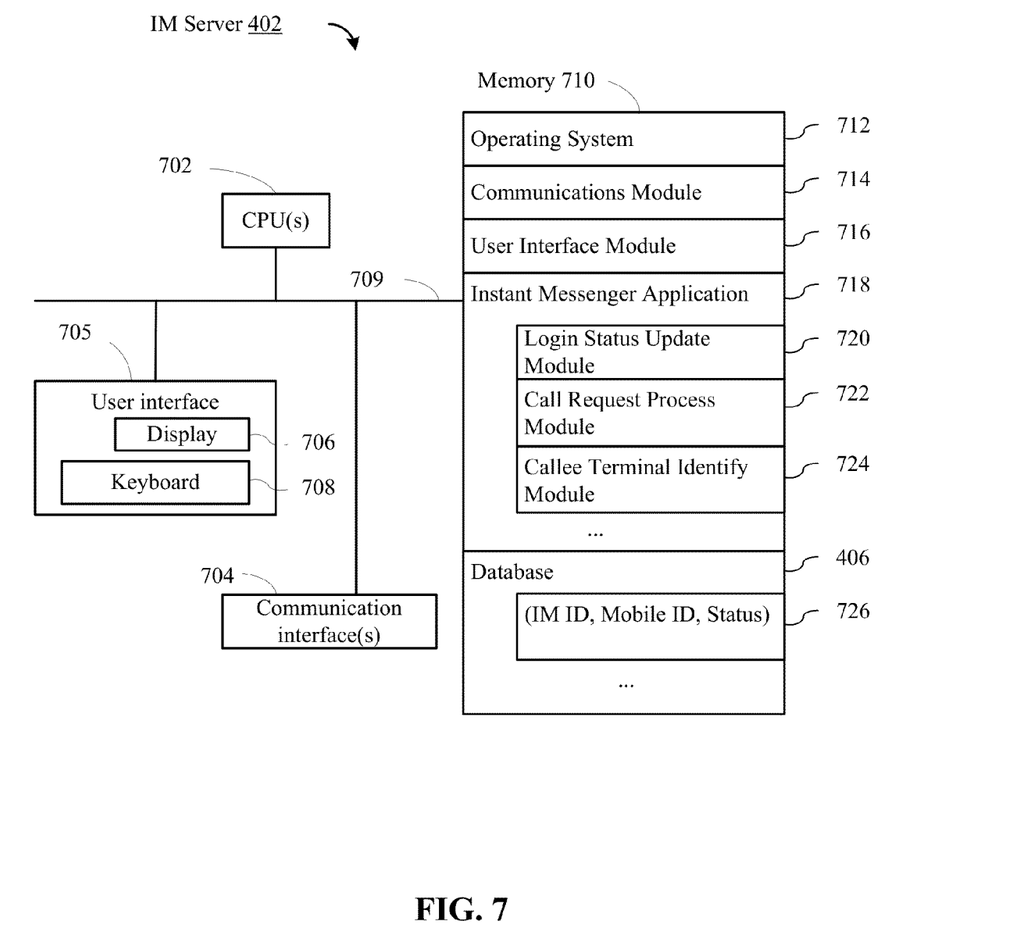
FIG. 7 is yet another block diagram illustrative of the components of an instant messenger server in accordance with some embodiments of the present application.

FIG. 7 is yet another block diagram illustrative of the components of the IM server 402 shown in FIG. 5 in accordance with some embodiments of the present application. The IM server 402 typically includes one or more processing units (CPU's) 702, one or more network or other communications interfaces 704, memory 710, and one or more communication buses 709 for interconnecting these components. The communication buses 709 may include circuitry (sometimes called a chipset) that interconnects and controls communications between system components. The IM server 402 may include a user input device 705, for instance, a display 706 and a keyboard 708. Memory 710 may include high speed random access memory and may also include non-volatile memory, such as one or more magnetic disk storage devices. Memory 710 may include mass storage that is remotely located from the CPU's 702. In some embodiments, memory 702, or alternately the non-volatile memory device(s) within memory 702, comprises a non-transitory computer readable storage medium. Memory 702 or the computer readable storage medium of memory 702 stores the following elements, or a subset of these elements, and may also include additional elements:

- an operating system 712 that includes procedures for handling various basic system services and for performing hardware dependent tasks;
- a network communication module 714 that is used for connecting the IM server 402 to a remote computer (e.g., the caller terminal 401 or the service control point 403) or other computers via one or more communication networks (wired or wireless), such as the Internet, other wide area networks, local area networks, metropolitan area networks, and so on;
- a user interface module 716 configured to receive user inputs through the user interface 705; and
- an instant messenger application 718 for allowing users at different terminals to exchange information (including engaging a voice communication); in some embodiments, the instant messenger application 718 further including:
  - a login status update module 720 as described above in connection with FIGS. 5 and 6;
  - a call request process module 722 as described above in connection with FIGS. 5 and 6; and
  - a callee terminal identify module 724 as described above in connection with FIGS. 5 and 6.
- a database 406 configured to receive user inputs through the user interface 705, the database including multiple entries and each entry having an IM service callee user ID, a mobile ID of a callee terminal associated with the callee user, and a status indicating whether the callee terminal is available for receiving call requests from a caller terminal.

Note that the aforementioned computer system receives voice call requests from a remote caller terminal and then determines which callee terminal, if any, to contact in order to start the voice communication between the two terminals. If the callee terminal is a legacy feature phone that cannot communicate directly with the caller terminal through the IM server 402, the IM server 402 then contacts a service control point and lets the service control point determine whether the callee terminal is capable of answering the call request.

The ordinary technicians engaging in this field are capable to understand all or partial steps of various methods in the above mentioned embodiments can be achieved by instructions from programs to related hardware. Such programs can be stored in the readable memory medium, including: flash disk, Read-Only Memory (ROM), Random Access Memory (RAM), disk or CD, etc.

Contents listed above introduce the method, the device and the system for voice communication according to some embodiments of the present application in detail. Specific cases are applied in the context to elaborate the principles and implementation mode of the present application. Embodiments above are only the assistance to understanding of the methods and core concepts of the present application. At the same time, for ordinary technicians in this field, the specific implementation mode and the application scope is subject to change according to concepts of the present application. In conclusion, contents to the instruction manuals shall not be interpreted to be limitations to the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for enabling voice communication between two terminals through instant messaging (IM) service, the method comprising:
   at a computer server having one or more processors and memory storing programs to be executed by the one or more processors:
      receiving a message from a remote computer, the message including an IM identifier of a callee terminal user of the IM service and a mobile device identifier of the callee terminal;
      updating an entry for the callee terminal user of the IM service in a database at the computer server, the entry including the IM identifier of the callee terminal user and the mobile device identifier of the callee terminal;
      receiving a voice communication request from a caller terminal user of the IM service at a caller terminal to start voice communication with the callee terminal user of the IM service, the request including the IM identifier of the callee terminal user; and
      in response to the voice communication request:
         identifying the database entry that includes the IM identifier of the callee terminal user;
         sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and
         establishing a voice communication channel between the caller terminal and the callee terminal using the IP address and the port number of the callee terminal.

2. The computer-implemented method of claim 1, wherein the caller terminal includes an application enabling a user to access the IM service directly from the caller terminal and the callee terminal does not include the application.

3. The computer-implemented method of claim 2, wherein the caller terminal is a smart phone and the callee terminal is a feature phone.

4. The computer-implemented method of claim 1, wherein the database includes multiple entries associated with the callee terminal user of the IM service and there is no more than one callee terminal that is configured to establish a voice communication channel with the caller terminal.

5. The computer-implemented method of claim 4, further comprising:
upon receiving the request from the caller terminal user:
identifying the multiple entries associated with the callee terminal user of the IM service and their associated status information;
determining whether there is a callee terminal that is ready to establish a voice communication channel with the caller terminal based on the status information; and
returning a response to the caller terminal user of the IM service if no callee terminal is in an active status.

6. The computer-implemented method of claim 1, further comprising:
upon receiving multimedia data from the caller terminal:
determining whether the callee terminal has the capability of processing the multimedia data;
in accordance with a determination that the callee terminal does not have the capability of processing the multimedia data:
storing the multimedia data in a database entry corresponding to the callee terminal; and
sending a text-based hyperlink to the stored multimedia data to the callee terminal; and
in accordance with a determination that the callee terminal has the capability of processing the multimedia data, forwarding the multimedia data to the callee terminal.

7. The computer-implemented method of claim 6, wherein the multimedia data is one selected from the group consisting of text, image, video, and audio.

8. A computer system for enabling voice communication between two terminals through instant messaging (IM) service, comprising:
one or more processors;
memory; and
one or more programs stored in the memory and configured for execution by the one or more processors, the one or more programs including instructions for:
receiving a message from a remote computer, the message including an IM identifier of a callee terminal user of the IM service and a mobile device identifier of the callee terminal;
updating an entry for the callee terminal user of the IM service in a database at the computer server, the entry including the IM identifier of the callee terminal user and the mobile device identifier of the callee terminal;
receiving a voice communication request from a caller terminal user of the IM service at a caller terminal to start voice communication with the callee terminal user of the IM service, the request including the IM identifier of the callee terminal user; and
in response to the voice communication request:
identifying the database entry that includes the IM identifier of the callee terminal user;
sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and
establishing a voice communication channel between the caller terminal and the callee terminal using the IP address and the port number of the callee terminal.

9. The computer system of claim 8, wherein the caller terminal includes an application enabling a user to access the IM service directly from the caller terminal and the callee terminal does not include the application.

10. The computer system of claim 9, wherein the caller terminal is a smart phone and the callee terminal is a feature phone.

11. The computer system of claim 8, wherein the database includes multiple entries associated with the callee terminal user of the IM service and there is no more than one callee terminal that is configured to establish a voice communication channel with the caller terminal.

12. The computer system of claim 11, wherein the one or more programs further comprises instructions for:
upon receiving the request from the caller terminal user:
identifying the multiple entries associated with the callee terminal user of the IM service and their associated status information;
determining whether there is a callee terminal that is ready to establish a voice communication channel with the caller terminal based on the status information; and
returning a response to the caller terminal user of the IM service if no callee terminal is in an active status.

13. The computer system of claim 8, wherein the one or more programs further comprises instructions for:
upon receiving multimedia data from the caller terminal:
determining whether the callee terminal has the capability of processing the multimedia data;
in accordance with a determination that the callee terminal does not have the capability of processing the multimedia data:
storing the multimedia data in a database entry corresponding to the callee terminal; and
sending a text-based hyperlink to the stored multimedia data to the callee terminal; and
in accordance with a determination that the callee terminal has the capability of processing the multimedia data, forwarding the multimedia data to the callee terminal.

14. The computer system of claim 13, wherein the multimedia data is one selected from the group consisting of text, image, video, and audio.

15. A non-transitory computer readable storage medium, storing one or more programs for execution by one or more processors of a computer system, the one or more programs including instructions for:
receiving a message from a remote computer, the message including an IM identifier of a callee terminal user of the IM service and a mobile device identifier of the callee terminal;
updating an entry for the callee terminal user of the IM service in a database at the computer server, the entry including the IM identifier of the callee terminal user and the mobile device identifier of the callee terminal;
receiving a voice communication request from a caller terminal user of the IM service at a caller terminal to start voice communication with the callee terminal user of the IM service, the request including the IM identifier of the callee terminal user; and in response to the voice communication request:
- identifying the database entry that includes the IM identifier of the callee terminal user;
- sending a voice communication request to a service control point in a switched telephone network, the voice communication request including the mobile device identifier of the callee terminal, wherein the service control point is configured to return an IP address and a port number of the callee terminal in accordance with the mobile device identifier of the callee terminal and launch a call request against the callee terminal; and
- establishing a voice communication channel between the caller terminal and the callee terminal using the IP address and the port number of the callee terminal.

16. The non-transitory computer readable storage medium of claim 15, wherein the caller terminal includes an application enabling a user to access the IM service directly from the caller terminal and the callee terminal does not include the application.

17. The non-transitory computer readable storage medium of claim 16, wherein the caller terminal is a smart phone and the callee terminal is a feature phone.

18. The non-transitory computer readable storage medium of claim 15, wherein the database includes multiple entries associated with the callee terminal user of the IM service and there is no more than one callee terminal that is configured to establish a voice communication channel with the caller terminal.

19. The non-transitory computer readable storage medium of claim 18, wherein the one or more programs further comprises instructions for:
upon receiving the request from the caller terminal user:
- identifying the multiple entries associated with the callee terminal user of the IM service and their associated status information;
- determining whether there is a callee terminal that is ready to establish a voice communication channel with the caller terminal based on the status information; and
- returning a response to the caller terminal user of the IM service if no callee terminal is in an active status.

20. The non-transitory computer readable storage medium of claim 15, wherein the one or more programs further comprises instructions for:
upon receiving multimedia data from the caller terminal:
- determining whether the callee terminal has the capability of processing the multimedia data;
- in accordance with a determination that the callee terminal does not have the capability of processing the multimedia data:
  - storing the multimedia data in a database entry corresponding to the callee terminal; and
  - sending a text-based hyperlink to the stored multimedia data to the callee terminal; and
- in accordance with a determination that the callee terminal has the capability of processing the multimedia data, forwarding the multimedia data to the callee terminal.

* * * * *